United States Patent [19]
Campbell et al.

[11] Patent Number: 5,703,593
[45] Date of Patent: Dec. 30, 1997

[54] ADAPTIVE DPCA SUBSYSTEM

[75] Inventors: Thomas A. Campbell, Huntington, N.Y.; Heinz H. Schreiber, Melbourne, Fla.; Niki Yioves, Douglaston, N.Y.

[73] Assignee: Northrop Grumman Corporation, Los Angeles, Calif.

[21] Appl. No.: 571,001

[22] Filed: Dec. 12, 1995

(Under 37 CFR 1.47)

[51] Int. Cl.$^6$ ................................ G01S 13/534
[52] U.S. Cl. ................... 342/96; 342/161; 342/162; 342/163; 342/194
[58] Field of Search ............... 342/96, 161, 162, 342/163, 195, 194

[56] References Cited

U.S. PATENT DOCUMENTS

| | | | |
|---|---|---|---|
| 4,093,950 | 6/1978 | ap Rhys | 342/149 |
| 4,121,209 | 10/1978 | ap Rhys | 342/161 |
| 4,825,213 | 4/1989 | Smrek | 342/25 |
| 4,885,590 | 12/1989 | Hasan | 342/196 |
| 4,914,441 | 4/1990 | Brookner | 342/161 |
| 4,914,442 | 4/1990 | Kretschmer, Jr. et al. | 342/162 |
| 5,061,934 | 10/1991 | Brown et al. | 342/162 |
| 5,357,256 | 10/1994 | Peperone | 342/160 |
| 5,510,796 | 4/1996 | Applebaum | 342/162 |
| 5,539,412 | 7/1996 | Mendelson | 342/192 |

OTHER PUBLICATIONS

Cecelia Jankowski, "E-2C Digital GRASP Technology Insertion," Apr. 16-20, 1990, Orlando, Florida.

Merrill Skolnik, "Adaptive Arrays," *Radar Handbook*, pp. 16.23-16.26.

*Primary Examiner*—John B. Sotomayor
*Attorney, Agent, or Firm*—Terry J. Anderson; Karl J. Hoch, Jr.

[57] ABSTRACT

An ADPCA subsystem includes a weight processor for weighting the delta channel signal according to the results of an adaptive algorithm to which the output of a DPCA vector combiner is input. An AMTI vector combiner is connected to the output of the DPCA vector combiner to form the filter output. The delta channel signal is time delayed and samples of the delta channel signal are collected by the processor together with a sum channel sample and a residue sample, in order to apply the proper weights to the undelayed and delayed delta channel samples. The output of the ADPCA weight processor therefore provides an optimum correction signal to the vector combiner.

10 Claims, 2 Drawing Sheets

ADAPTIVE DPCA SUBSYSTEM

BACKGROUND OF THE INVENTION

1. Field of the Invention

This invention relates to a radar system, and in particular to a precision, airborne track-while-scan radar system capable of automatically detecting and tracking multiple airborne and surface targets within a large detection volume mostly dominated by land, sea or land-sea interface clutter.

2. Description of the Related Art

Surveillance radar systems must detect a large range of targets, including smaller airborne targets, missiles and stealth aircraft, and targets located on the surface of the sea or land. Interfering clutter echoes can severely limit the detectability of such targets. Airborne surveillance radars operate in environments where the majority of the detection volume is dominated by land, sea or land/sea interface clutter. These clutter environments degrade radar performance because targets of interest have significantly smaller radar cross sections than competing surface returns. Clutter magnitude and spectral characteristics limit the ability of a radar system to detect small targets by affecting the magnitude and spectral density of the echo. Land sea, and land/sea interface clutter are volatile, dynamically different throughout the detection range, and the clutter environment changes over an antenna beamwidth and throughout the search volume. During a range sweep, the radar may have to deal with land clutter, sea clutter, land clutter again and then the absence of clutter. In one complete scan of the detection volume, the radar must be able to adjust to all types of clutter including a clutter free region beyond the clutter horizon. In many instances, these clutter environments will exist within the antenna beamwidth. Therefore, the radar must be capable of discriminating the targets of interest from dynamically changing and different types of clutter.

Airborne search radars, initially known as Airborne Moving Target Indication (AMTI) radars, were originally developed for the detection of ships by long range patrol aircraft, and subsequently have been used to detect low-flying aircraft approaching a naval task force below its radar horizon, as determined by the height of the ship's antenna. Where their primary mission is detecting low-flying aircraft and surface vehicles, AMTI search radars are subject to at least two significant disadvantages: 1) the AMTI Vector Combiner can not provide satisfactory clutter rejection characteristic regardless of the number of cascaded sections and 2) the antenna vertical beam (range) is precluded from being used as a clutter discriminator because of the continuous detection and tracking requirement, the latter requirement involving the need for an update every few seconds. These limitations force the radar to use a more sophisticated high performance, high precision clutter cancellation filter than is required for ground or sea based radar systems.

Conventional AMTI radar systems are Doppler-based systems in which stationary targets are distinguished from moving targets by measuring the relative velocity between the radar platform and the echo. The phase difference between consecutive received pulses is measured by combining vectors derived from consecutively received pulses in a simple AMTI Vector Combiner. The AMTI clutter cancellation filter characteristic (transfer function) can be described mathematically by the equation:

$$H(f_d) = |\sin(\pi f_d/PRF)|^n,$$

where $f_d$=echo Doppler frequency

PRF=Pulse Repetition Frequency
n=number of delay (PRI) lines in

This filter has n zeros located at zero Doppler frequency and a single filter has a single zero. The width of the rejection notch is generally too narrow to be effective against most clutter. The clutter signals, even though representing stationary landscape features, have a finite spectral width (due to internal fluctuations) which is region specific if not region unique. Land clutter may be several Hz wide depending on vegetation, surface wind and speed and radar frequency. Sea clutter may be 20 Hz wide and may not be centered at zero Doppler frequency. Sea clutter internal motion is due to the vector orientation of ocean currents and surface wind conditions. Platform motion, antenna motion and radar operating frequency affect the intrinsic "stationary" clutter bandwidth. The radar operating frequency adds indirectly to the modulation because it affects the antenna beam width. When the antenna look angle is coincident with the platform ground velocity vector, the radar/platform motion imparts a Doppler frequency associated with the platform ground velocity, but it does not materially add to the clutter spectral width. When the antenna look angle is orthogonal to the platform ground velocity vector, the platform ground velocity does not provide a Doppler Frequency to the clutter. However, the antenna beamwidth (radar operating frequency) and radar/platform motions add significantly to the intrinsic clutter spectral width. The increase is dependent on the platform ground velocity, the radar azimuthal antenna beam-width, and the radar operating frequency. The effective 50 to 60 dB AMTI filter notch width is less than 1 or 2 Hz and, therefore, most clutter returns can not be canceled sufficiently by the AMTI filter. Either land or sea clutter will capture the radar detectors.

Because the AMTI filter notch aliases at multiples of the pulse repetition frequency (PRF), the effective detection volume for airborne targets is reduced by the bandpass characteristic of the AMTI filter. The effective detection volume is reduced when the AMTI filter bandpass characteristic is activated. The detection volume is a function of target size. Small targets may have their detection volume reduced when the AMTI filter in engaged. Apparent slower moving targets are more difficult to discern from stationary targets. The clutter cancellation problem is aggravated in airborne radars because stationary targets are moving in relation to the platform due to its motion and the antenna look angle relative to the platform velocity vector. The stationary clutter Doppler frequency is actually received as a varying frequency due to variation in platform motion and antenna look angle. In addition, the instantaneous clutter spectral width is a function of platform velocity, the antenna look angle and the antenna azimuthal beamwidth. In order to eliminate clutter, therefore, it is either necessary to make the system adaptive to platform motion and continually change the frequencies at which clutter is rejected, or it is necessary to minimize the effects of platform motion.

To overcome the AMTI radar's clutter rejection limitation, the mainbeam clutter rejection filter design evolved into the Displaced Phase Center Antenna (DPCA), which provides a wider stop band notch filter without significantly reducing the bandpass characteristic associated with multiple aliases. The stopband characteristic can be approximated in most areas of the world to provide sufficient mainbeam clutter rejection (−55 dB). This allows automatic detection and tracking of medium size targets in clutter environments. The DPCA filter characteristic has three zeros located at −fn, zero, and +fn Hz. The two zeros located at ±fn are generated by the DPCA Vector Combiner, and the zero located at zero Hz is generated by the AMTI Vector Combiner. The DPCA filter's two zeros are controllable which allows for an adjustable notch bandwidth. The location of the zero can be controlled for antenna look angle, radar operating frequency, and platform ground velocity. The DPCA filter width is modulated as a function of all three parameters. This feature allows the clutter rejection filter to improve detection performance around the platform.

The latter approach is conventionally accomplished by either physically displacing one of two antennas relative to the direction of platform motion, for example, in a monopulse tracking system, so that the second pulse arrives at the trailing antenna at the same position at which the first pulse arrived at the leading antenna due to platform motion and attitude, thus canceling out the effect of platform motion. The same effect may be achieved electronically by adding and subtracting from the vectors representing consecutive pulses a component representative of the contribution from platform motion. This approach is known as the Displaced Phase Center Antenna (DPCA) as shown in the *Radar Handbook* by Merrill I. Skolnik.

As shown in FIG. 1, the conventional DPCA subsystem has four essential parts: a DPCA Antenna 1, a DPCA modulator 7, a DPCA Vector Combiner 10 and an AMTI Vector Combiner 16. Each part contributes a specific task which is necessary to implement a mainbeam clutter rejection filter. Typically the conventional DPCA subsystem has a single DPCA Vector Combiner and a single AMTI Vector Combiner to meet a 60 dB clutter cancellation ratio. This implementation is satisfactory if the radar's mission is to detect and track medium sized airborne targets over the majority of the world's surface. The conventional DPCA subsystem can have multiple DPCA and/or AMTI Vector Combiners to enhance mainbeam clutter cancellation.

The DPCA Antenna 1 is specifically designed to be an integral part of a clutter rejection filter. The antenna provides three signals to the DPCA Modulator 7: a Σ (sum) Channel signal, a j Δ (difference) Channel signal, and a Look Angle signal. The DPCA Antenna 1 has five parts; a Common Aperture 2, a Sigma (sum) Corporate Feed Network 3 a Delta (difference) Corporate Feed Network 4, a Scanning Device 5, and a Look Angle Monitor 6. The Common Aperture 2 can be either a planar or a line array. Each row is formed by an even number of individual radiators. Each column (if a planar array) is equally divided and fed to two independent microwave beamformers to assure that the same instantaneous information is processed by both the Sigma Corporate Feed Network 3 and the Delta Corporate Feed Network 4 to simultaneously form Σ Channel and Δ Channel signals. This configuration enhances the possibility that the two signals are co-linear and time synchronized. The Sigma Corporate Feed Network 3 amplitude weights the signal from each column and adds these signals in phase to provide a maximum signal on boresight. These signals are amplitude weighted to control spatial sidelobes to minimize sidelobe clutter from the detection process.

The Delta Corporate Feed Network 4 divides the aperture into two equal columns of radiators. It weights each group of columns and adds them in phase. It then subtracts the two groups of signals. This provides a minimum signal or difference signal on boresight. Because the receiving process forms vectors, the different corporate feed networks assure that the Σ and Δ Channel signals are in time quadrature, and hence that the j operator is associated with the Δ Channel signal. The two corporate feed networks must be completely independent to provide the proper weighting for each process across the aperture for sidelobe control. It is also necessary for the first nulls of both patterns to occur at the same azimuthal angles. This is mandatory to assure that the two variable zeroes can be continuously controlled, thereby achieving the desired stop band filter characteristics.

In most radar systems the antenna is scanned either electronically or mechanically. In the typical subsystem illustrated, a mechanical scanning implementation is used, as indicated by the drive motor (M) 5. As the antenna look angle varies with respect to the platform flight vector, the clutter Doppler frequency and spectral width changes. The clutter Doppler Frequency along the antenna boresight is expressed by $f_d = 2V_g \cos\alpha * f_o/C$. The antenna look angle ($\alpha$) information is generated either by a resolver (not shown) or a synchro 6 which is aligned to the platform heading vector. The platform heading vector is an approximation of the platform ground velocity vector. This look angle signal is transmitted to the DPCA modulator where it is used to adjust the filter notch width based on an estimated clutter spectral width.

The DPCA modulator 7 modulates the jΔ Channel signal to form a jKΔ signal and time delays the Σ Channel signal to assure time and phase alignment for proper operation in the DPCA Vector Combiner 10. The DPCA Modulator 7 has two parts: a Δ Channel Scalar Modulator 8 and a fixed Time Delay Synchronizer 9. The Δ Channel Scalar Modulator 8 weights the jΔ Channel signal by attenuating it to provide the estimated signal level for the DPCA Vector Combiner 10. The weighted jΔ Channel signal essentially controls the Doppler frequency, $f_n$, at which the two variable zeros will occur, thereby controlling the width of the stop band notch. The weight is applied for the entire detection range and is updated once a sweep. The weight is calculated using four parameters which can be expressed by $K = f'kVg \cos\alpha$ where f' is a factor used to correct for the radar operating frequency and k is a nominal value estimated for a mean value of the clutter spectral spread. The value for k is empirically derived from a large statistical base of flight data collected during the development phases at the platform detection test range. $V_g$ is a short term average platform velocity, and is provided by the navigation system. $\alpha$ is the antenna look angle provided by the DPCA antenna 1 and referenced to the platform heading vector. The clutter cancellation is limited because this value of k cannot account for the vastly differing clutter magnitudes and spectral variations encountered in actual operating environments. The Δ Channel Scalar Modulator 8 output provides the jKΔ signal for addition to the delayed Σ Channel signal in the DPCA Vector Combiner 10. The Δ Channel Scalar Modulator 8 requires a finite processing time to modulate the Δ Channel signal. The Time Delay Synchronizer 9 delays the Σ Channel signal for proper time synchronizing with the modified Δ Channel signal.

The conventional DPCA Vector Combiner 10 processes the delayed Σ Channel signal and the orthogonal jKΔ Channel signal to form a notch filter characteristic that has two variable zeroes along the Doppler frequency axis. The DPCA Vector Combiner 10 has five parts: 1) a sigma/delta delay signal adder 11, 2) a sigma/delta undelayed signal adder 12, 3) a delta channel vector divider 13, 4) a pulse repetition interval delay 14, and 5) a delay/undelayed signal adder 15. Combining the Σ Channel and modified Δ Channel jKΔ signal vectorially provides two adjustable zeros for the filter process which is used to adjust the filter stop band width as a function of the antenna look angle and the platform ground velocity $V_g$. The two zeros are positioned by the magnitude of the Δ signal jKΔ. The larger the magnitude of the quadrature Δ Channel signal, the further the zeroes are separated. As the modulator changes the magnitude of the Δ Channel signal, the filter notch width is modulated to adjust to the estimated clutter environment.

The AMTI Vector Combiner 16 is a standard configuration, and has two parts: a PRI delay 17 and a delayed/undelayed signal adder 18. This combiner has a single zero at zero Doppler frequency which provides rejection of the stationary, narrow spectral width clutter returns. Most land clutter has very high magnitude returns centered at zero Doppler, and as a result this zero is essential to provide cancellation at zero Hz and to maintain a reasonably flat stop band notch characteristic. This characteristic is essential to achieve the mainbeam clutter cancellation required by the DPCA subsystem. AMTI combiners can also be cascaded to provide additional orders of rejection around zero Doppler shift.

The present invention improves the conventional DPCA subsystem by modifying the DPCA modulator, improving the DPCA vector combiner and adding an adaptive algorithm weight processor. The improved subsystem uses a closed loop negative feedback circuit to modify the correction factor in order to minimize the residue vector and achieve perfect cancellation, thus optimizing the DPCA subsystem output. The ADPCA filter is also automatically disengaged if no clutter is involved. This feature significantly improves the target detection volume of the radar system.

Because the invention applies adaptive techniques to a DPCA system, it is referred to as an adaptive (ADPCA) system.

SUMMARY OF THE INVENTION

It is accordingly an objective of the invention to provide a precision, airborne track-while-scan radar system with the capability of detecting targets in a high clutter background.

It is a further objective of the invention to provide a precision, airborne track-while-scan radar system with the capability of improved surface traffic detection in land, sea and land/sea interface clutter.

It is a further objective of the invention to provide a precision, airborne track-while-scan radar system with an enlarged airborne target detection volume.

It is a further objective of the invention to provide a precision, airborne track-while-scan radar system having an increased target detection and tracking capacity.

It is a further objective of the invention to reduce a precision, airborne track-while-scan radar system's operator work load particularly in land, sea and land/sea interface clutter operating environments.

It is a further objective of the invention to provide an ADPCA subsystem capable of reducing mainbeam surface related clutter average residue in land, sea and land/sea interface clutter environments.

It is a further objective of the invention to provide ADPCA subsystem capable of reducing mainbeam surface related clutter peak residue in land, sea and land/sea interface clutter environments.

It is a further objective of the invention to provide a DPCA subsystem capable of improved land, sea and land/sea interface clutter rejection which will result in fewer clutter related false alarms and false tracks.

These objectives are achieved by modifying a conventional DPCA filter as follows: provide a new ADPCA modulator(s), modify an existing DPCA vector combiner(s), add a new Adaptive Algorithm Weight Processor and add an ADPCA Algorithm. The new ADPCA Modulator provides the capability of putting out several vector corrected Δ Channel signals and a variable Σ Channel delay. This flexibility is necessary to automatically have several filter configurations able to adapt to the actual clutter environment. The DPCA vector combiner needs modification to accommodate the new vector correction signal, and thus an ADPCA weight processor is provided which applies a new ADPCA adaptive algorithm to the residue vector and which adjust the inputs to the automatically selected delta channel modulators accordingly. In its broadest form, therefore, the invention provides a channel input, a modulated delta channel input, a vector combiner, and a weight processor connected to the output of the vector combiner for modifying the delta channel signal in a manner which tends to minimize the residue vector.

The most preferred embodiment of the invention therefore operates over three rather than two pulse intervals and can take into account errors in the subsystem output.

The invention provides significant radar performance improvements in small target detection, improved surface traffic detection, enlarged detection volume, increased target capacity, and reduced operator work load. Conventional DPCA subsystems are limited because the filter characteristics variations are based on predictions of clutter characteristics, by the once a range sweep filter coefficient updating, by an inability to correct for several platform/radar operational anomalies, and because of several unrealistic assumptions. The present invention improves system performance by deciding when to engage the filter and automatically calculating clutter rejection filter characteristics and configuration to adapt to actual clutter dynamics. It also includes the capability to balance an increased number of on-board radar parameters to correct for operating anomalies and antenna pattern perturbations and unknown platform variations such as crab angles and YAW characteristics.

The ADPCA subsystem of the invention thus improves small target detection, improves surface (land and sea) traffic detection, provides a larger practical detection and tracking volume, and reduces the number of clutter induced false alarms and false tracks. The ADPCA subsystem will bypass the mainbeam clutter rejection filter when no clutter is present in the incoming signals. Because the detection volume is also defined by velocity vectors and the clutter filter has multiple velocity holes, the filter bypass when no clutter is present will improve the detection volume. This also significantly increases the detection and tracking volume. The ADPCA subsystem optimizes the mainbeam clutter rejection filter on a range cell to range cell basis. It improves main beam clutter rejection by optimizing the clutter rejection filter width and depth for the radar operating environment, thereby providing continuous updates. It will significantly reduce clutter induced false alarms and will significantly reduce the detection threshold. The clutter induced false alarms overload the radar detection capability and leads to false tracks that overload the radars tracking capability. By reducing the detection thresholds, the radar will be able to automatically detect much smaller targets in clutter dominated environments.

DETAILED DESCRIPTION OF THE PREFERRED EMBODIMENTS

Figure 1:
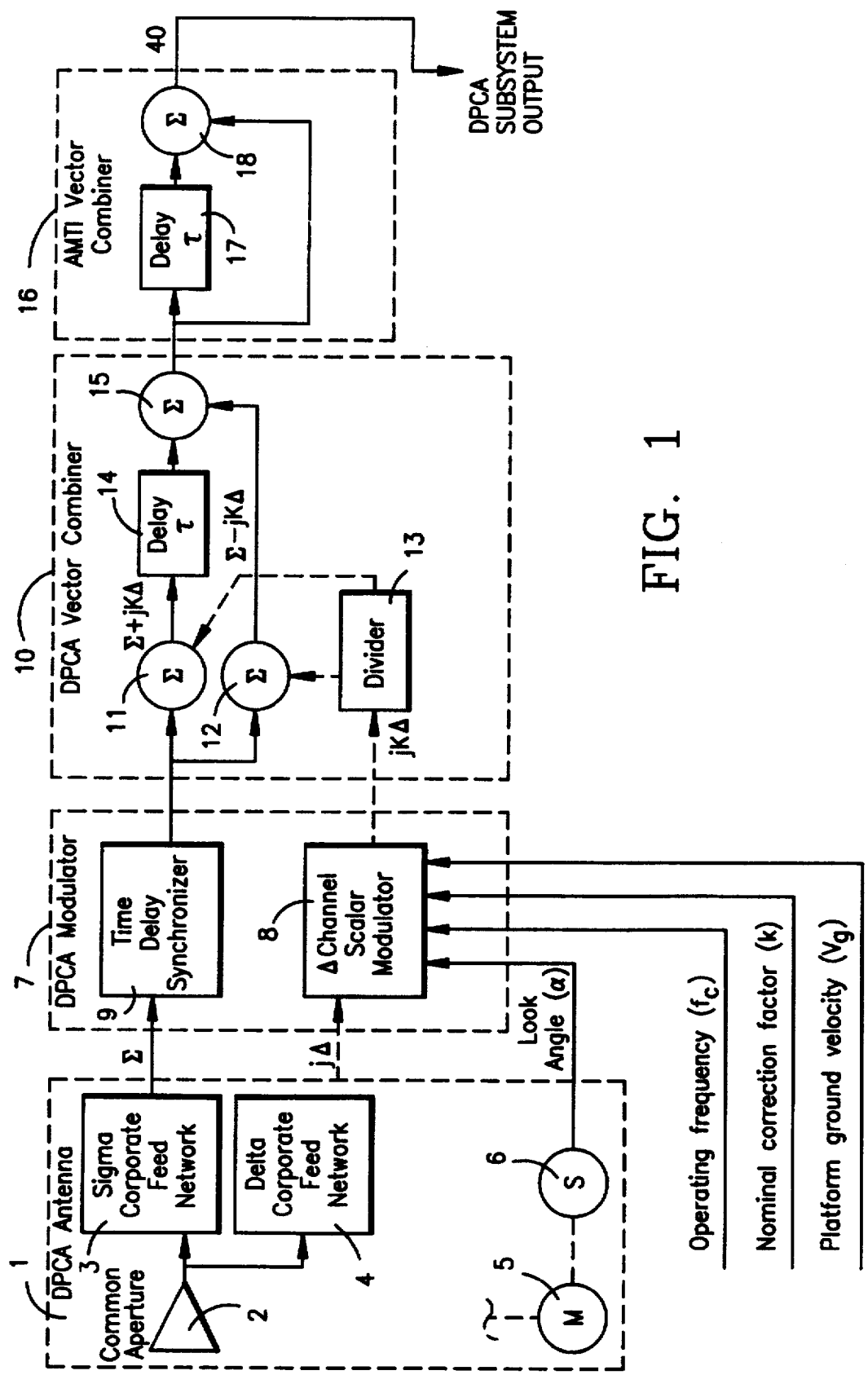
FIG. 1, is a functional block diagram illustrating a conventional DPCA subsystem architecture.
Figure 2:
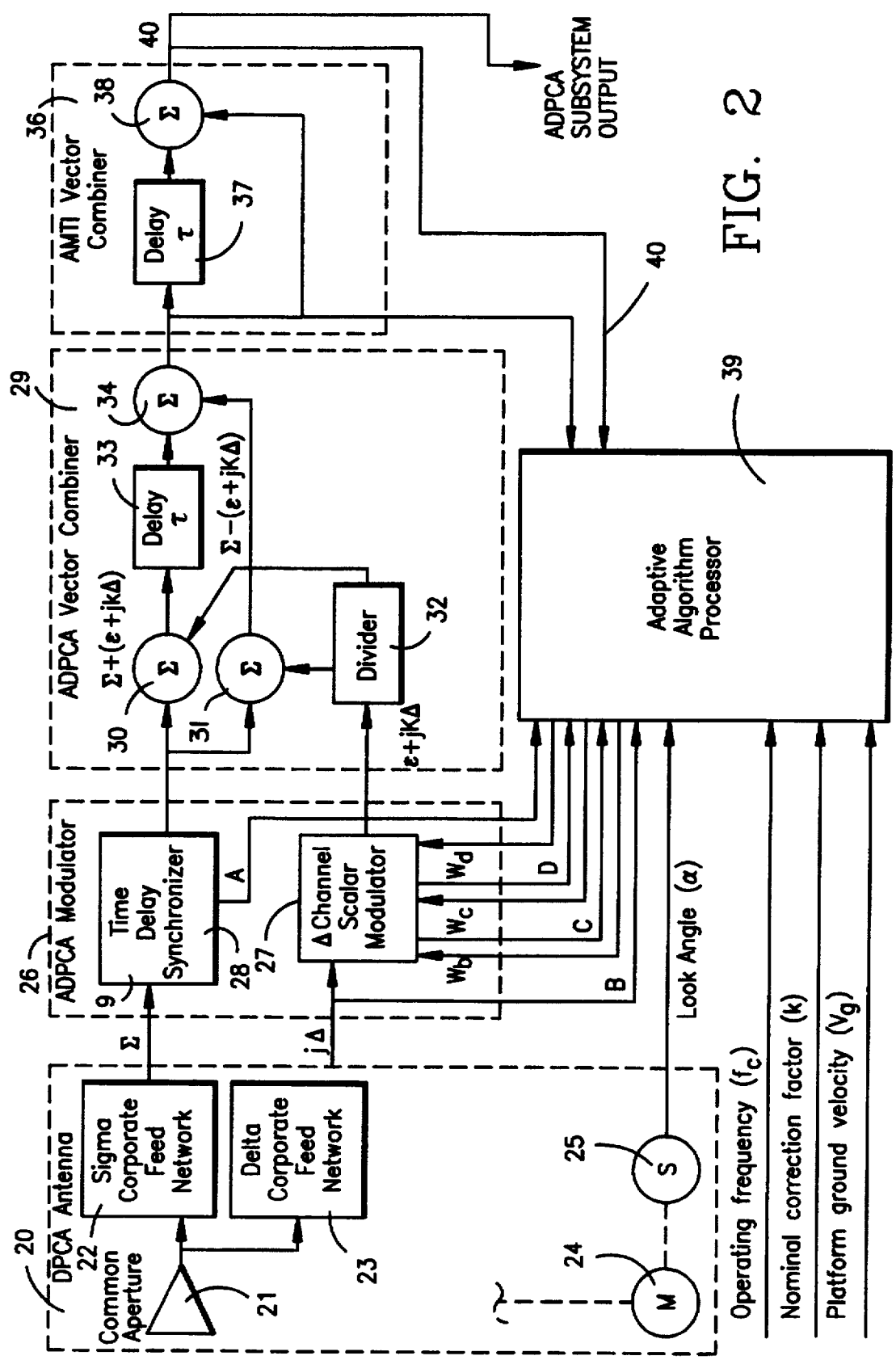
FIG. 2 is a functional block diagram illustrating the architecture of a preferred embodiment of the ADPCA subsystem of the invention.

FIG. 2 is a functional block diagram illustrating a preferred architecture of the invention. The Adaptive Displace Phase Center Antenna(ADPCA) subsystem has five essential parts: a DPCA Antenna 20, an ADPCA Modulator 26, an ADPCA Vector Combiner(s) 29, an AMTI vector combiner(s) 36, an Adaptive Algorithm Weight Processor 39, and an ADPCA adaptive algorithm. Each part contributes specific tasks to implement a sufficient mainbeam clutter rejection filter. It will be appreciated by those skilled in the art that, while corporate feed patterns are shown, other feed patterns may be substituted. Together, the aperture 21 and the sigma and delta corporate feeds 22 and 23 may be associated with a conventional rotodome or similar platform structure.

The DPCA Antenna 20 for the ADPCA subsystem has the same function and configuration as the conventional DPCA subsystem. It provides the same three signals that must fulfill all the requirements. It has the same parts: a common aperture 21, a Sigma Corporate Feed Network 22, a Delta Corporate Feed Network 23, a scanning device M 24, and a look angle monitor synchro generator 25. The description of this part is identical to the description provided above. The alignment of the two antenna phase centers is subject (in situ) to operational wandering beyond the control of the designers. The ADPCA subsystem offers the capability of making appropriate corrections.

The ADPCA modulator 26 involves a significant modification to the conventional DPCA Modulator. The major change is to the $\Delta$ Channel modulator. The new modulator generates a vector $\epsilon+jK\Delta$ which provides a more comprehensive correction factor. It also has two parts, a $\Delta$ Channel Vector Modulator 27 and a variable Time Delay Synchronizer 28. The delta channel modulator is a vector correction unit as well as providing the varying amplitude delta channel signal to optimize the DPCA filter. The adaptive filter corrects the delta channel signal on a range cell by range cell basis. The delta channel vector modulator 27 adjusts the delta channel signal to provide the correct signal level for the DPCA combiner. The modulator provides three delta channel samples and one sigma sample to the Adaptive Algorithm Weight Processor. The modulator has three weights that it applies to the delta signal. These weights provide the proper vector for addition to the sigma signal in the DPCA combiner. The delta channel vector modulator requires a finite processing time to fully implement the delta signal correction. The time delays synchronizer delay the $\Sigma$ Channel signal for proper time synchronizing with the modified delta signal. Since the delta channel has a finite time delay associated with the modulation process, it is essential that the $\Sigma$ channel signal have an equivalent time delay. The $\Sigma 0$ channel signal and the delta channel signal must have equal phase shifts, amplitude attenuation and time delays for the signal to be properly processed through the DPCA vector combiner.

The ADPCA Vector Combiner 29 is a modification of the DPCA Vector Combiner to permit the subsystem to make a new vector alignment correction. The additional component developed in the $\Delta$ Channel Vector Modulator 27 can be used to align the two input vectors to assure orthogonality. Orthogonality is essential for the clutter rejection filter to be optimized. The ADPCA Vector Combiner 29 has five parts: a delta channel Divider 32, a sigma/delta delayed signal adder 30, a sigma/delta undelayed signal adder 31, a pulse repetition interval delay 33, and a delayed/undelayed signal adder 34. Combining the $\Sigma$ Channel and the $\epsilon+jK\Delta$ Channel signals vectorially does two things: it aligns the Channel signal to assure orthogonality and it provides for two variable zeroes to form a matching stop band width. For the filter characteristic to function properly, it is necessary for the main signal, $\Sigma$ Channel, and the clutter cancellation factor, $jK\Delta$, to provide two adjustable zeros in order to adjust the filter stop band width. The two zeros are positioned by the magnitude of the delta signal. The larger the magnitude of the quadrature delta signal, the further the zeros are separated. As the modulator changes the magnitude of the delta signal, the filter can be optimized to match the actual clutter environment exactly or to correct for anomalies in the platform/radar interface. By matching the filter to the clutter environment, the clutter is rejected with greater efficiency. This significantly reduces both the average and the peak clutter residue and has significant affects on the radar performance. The smaller average clutter residue reduces the detection thresholds in the clutter region and these reduced detection thresholds permit the radar to detect smaller targets. The reduced peak clutter residues also reduce the number of clutter associated detections. With a high incidence of clutter detections, both the detector processor and the tracking processors associate disparate signals and declare them to be a target. This leads to overloading the radar display and the tacking computers. Reduction of these clutter associated detections reduces the load capacity on both the radar detector and the tracking computer. This releases both of these devices to hold more actual targets in the system, i.e., it increases the target capacity of the radar. The two zeros can be translated with respect to zero Doppler shift to adapt to clutter spectral bias shifts.

Several DPCA combiners can be cascaded to achieve greater clutter cancellation to meet specific mission requirements and each additional DPCA combiner can be tailored to provide additional sets of zeros. These additional degrees of freedom can be used to provide a more uniform filter notch or they can be used in extremely high clutter regions to extend the width of the filter notch.

By automatically adjusting the zeros to the optimized positions, the filter is adjusted to correct antenna and line balance problems, and also to accommodate to the dynamics of the incoming clutter returns.

The AMTI Vector Combiner 36 is a standard configuration that provides the essential zero at zero Hz to maintain adequate clutter cancellation. It has two parts: a PRI delay 37 and a delayed/undelayed signal adder 38. This combiner adds an essential third zero to the ADPCA subsystem, located at zero Doppler frequency and provides rejection of the stationary, small spectral width clutter returns. Most land clutter has very high magnitude returns centered at zero Doppler. AMTI combiners can also be cascaded to provide additional rejection around zero Doppler shift.

The Adaptive Algorithm Weight Processor calculates the optimum clutter filter coefficients on a range cell by range cell basis. To do this, the processor uses several inputs to calculate the optimum weights to be applied the ADPCA modulator. These inputs are 1) a sum signal reference, 2) three delta signal samples, 3) a clutter residue sample, 4) platform ground velocity, 5) antenna look angle, 6) radar operating frequency, and 7) a nominal scalar correction factor, It has several decisions to make: 1) is clutter present, 2) does the sigma and delta signal have to be phase shifted to provide orthogonality, and 3) what are the proper weights to apply to the DPCA vector modulator to optimize the mainbeam clutter cancellation. If clutter is not present, the processor bypasses the clutter filter for that range cell. If the weight processor has malfunctioned, the normal modulating parameters are switched in place of the calculated values.

The DPCA weight processor operates by applying a first coefficient $W_b$ directly to the delta channel signal, calculating a second coefficient $W_c$ and applying it to the delta channel signal after a delay of one clock interval. The delta channel signal is delayed a second clock interval, and multiplied with an updated coefficient $W_c$. The sum of the weighted delta channel signals (a transversal filter output, not shown) is then obtained by adder (not shown) and applied to the vector combiner 29 as a correction vector in the manner noted above. In order to calculate the coefficients, the original sigma and delta channel signals and each of the delayed delta channel signals are input to the adaptive algorithm processor 39 at inputs A–D.

The final inputs to the DPCA weight processor 39 is the output of AMTI vector canceler 40, which includes a PRI memory 37 and a second vector combiner 38 and the output of 29. Consecutive pulses with no phase change after cancellation of the platform motion will cancel, thus providing a null at the zero Doppler frequency. Because of the connection between AMTI vector combiner output 40 and processor 39, coefficients $W_b$, $-W_c$, $W_d$ take into account the outputs of both the DPCA vector combiner 29 and the AMTI vector combiner output 40, thus enabling the ADPCA to perform adequate clutter cancellation even for slow moving target in high clutter environment.

Having thus described a particular embodiment of the invention, it will be appreciated that variations are possible within the scope of the invention, and thus it is intended that the invention not be limited by the foregoing disclosure, but rather that it be limited solely by the appended claims.

We claim:

1. In a signal processing subsystem, including:

means for receiving a signal at a predetermined interval and converting said signal into signals representative of a sum channel vector and a difference channel vector;

means for modifying the difference channel vector to obtain a correction vector;

means for subtracting the correction vector from the sum channel vector to obtain a difference vector;

means for adding the correction vector to the sum channel vector to obtain a sum vector;

means for storing the sum vector for said predetermined interval;

means for combining the difference vector with the sum vector after having stored the sum vector for said predetermined interval, wherein the improvement comprises:

weight processor means connected between the vector combiner means and the difference channel modulating means for combining an output of said vector combiner with said difference channel signal in order to adaptively modify said correction vector to optimize said output of said vector combiner means.

2. A system as claimed in claim 1, further comprising means for combining consecutive outputs of said vector combiner means in a second vector combiner means to obtain a second output, and for feeding said second output back to said processor means.

3. A system as claimed in claim 1 wherein said subsystem, is a DPCA Doppler radar subsystem, said receiving and converting means includes an antenna aperture, a delta corporate feed, and a sigma corporate feed, said vector combiner means is a DPCA vector combiner, and said weight processor means includes an adaptive algorithm processor for minimizing a residue vector present in said output by generating coefficients for the difference channel vector.

4. A system as claimed in claim 3, further comprising means including an AMTI filter for combining consecutive outputs of said vector combiner in a second vector combiner means to obtain a second output, and for feeding said second output back to said processor means.

5. A system as claimed in claim 1 wherein said weight processor means includes a processor connected to receive the output of the vector combiner, multiplier means for combining a weight coefficients output by said processor with said difference channel vector to form a modified correction vector, and means for inputting the difference channel vector to said processor and the modified correction vector to said vector combiner.

6. A system as claimed in claim 5, wherein said weight processor means further comprises delay circuit means for delaying the signal representative of the difference channel vector by one said interval, and second multiplier means for combining a second coefficient with the delayed difference channel signal representative of the difference channel vector to form a modified correction vector and with said modified delayed difference channel signal to form a further modified correction vector.

7. A system as claimed in claim 6, wherein said weight processor further comprises second delay circuit means for delaying the delayed difference channel vector signal by a second said internal to form a modified twice delayed difference channel vector signal and a third multiplier for combining a third coefficient with the twice delayed difference channel vector signal, and means for combining said further modified correction vector with said modified twice delayed difference channel vector signal and a third multiplier for combining a third coefficient with the twice delayed difference channel vector signal, and means for combining said further modified correction vector with said modified twice delayed difference channel vector signal delay pulse to obtain said correction vector.

8. A system as claimed in claim 7, further comprising means for connecting an output of a second vector combiner means, connected to combine consecutive outputs of the first vector combiner means, with an input of said weight processor means.

9. A system as claimed in claim 8, wherein said subsystem is a DPCA Doppler radar subsystem, said receiving and converting means includes an antenna aperture, a delta corporate feed, and a sigma corporate feed, and vector combiner means is a DPCA vector combiner, and said weight processor means included an adaptive algorithm processor for minimizing a residue vector present in said output by generating coefficient for the difference channel vector.

10. A system as claimed in claim 1, wherein said subsystem is a DPCA Doppler radar subsystem and said processor means further includes means for inputting signals representative of an airborne platform velocity and platform angle relative to horizontal.

* * * * *